United States Patent [19]

Pearl

[11] Patent Number: 4,863,318
[45] Date of Patent: Sep. 5, 1989

[54] PANTOGRAPH MACHINE

[75] Inventor: Peter M. Pearl, Leucadia, Calif.

[73] Assignee: Kathleen M. Hash, Redway, Calif.

[21] Appl. No.: 58,584

[22] Filed: Jun. 5, 1987

Related U.S. Application Data

[63] Continuation-in-part of Ser. No. 875,618, Jun. 18, 1986, abandoned.

[51] Int. Cl.$^4$ .............................................. B23Q 35/10
[52] U.S. Cl. ......................................... 409/89; 409/90
[58] Field of Search ........................ 409/84, 85, 86, 88, 409/89, 90, 91, 92, 93, 109, 110, 111, 112, 115, 121, 122, 123, 131

[56] References Cited

U.S. PATENT DOCUMENTS

| | | | |
|---|---|---|---|
| 75,413 | 3/1868 | Hall | 409/91 |
| 1,925,036 | 8/1933 | Gorton | 409/90 |
| 2,178,131 | 10/1939 | Zwick | 409/86 |
| 2,199,261 | 4/1940 | Kapp et al. | 409/89 |
| 2,631,375 | 3/1953 | Gleason | 409/86 |
| 2,689,505 | 9/1954 | Ossenback | 409/89 |
| 2,729,892 | 1/1956 | Gruettner | 409/92 |
| 2,793,569 | 5/1957 | Tanner et al. | |
| 3,618,465 | 11/1971 | Brochard | 409/91 |
| 3,803,979 | 4/1974 | Young | |
| 4,278,117 | 7/1981 | Mitchell et al. | |

FOREIGN PATENT DOCUMENTS 2848602 6/1980 Fed. Rep. of Germany ........ 409/86

Primary Examiner—Z. R. Bilinsky
Attorney, Agent, or Firm—Knobbe, Martens, Olson & Bear

[57] ABSTRACT

A pantograph device is disclosed which accomplishes the duplication of a three-dimensional model to a proportionately reduced degree. The device renders a clear and distinct copy, including the undercutting of certain configurations if necessary. A guide mechanism acts a a follower for sensing the configuration of the model and transmitting its movement to a cutting mechanism which reproduces the model by cutting away unnecessary portions of a blank. The size of the copy produced by the cutting mechanism (that is, the degree of reduction from the model) can be varied in the present invention. The cutting and guide mechanisms are manufactured in alignment by the structural connections of the present invention. Furthermore, the ratios of the distance separating these mechanisms and a common print are maintained equivalent so that the size of the copy bears a similar relationship to the size of the model.

23 Claims, 7 Drawing Sheets

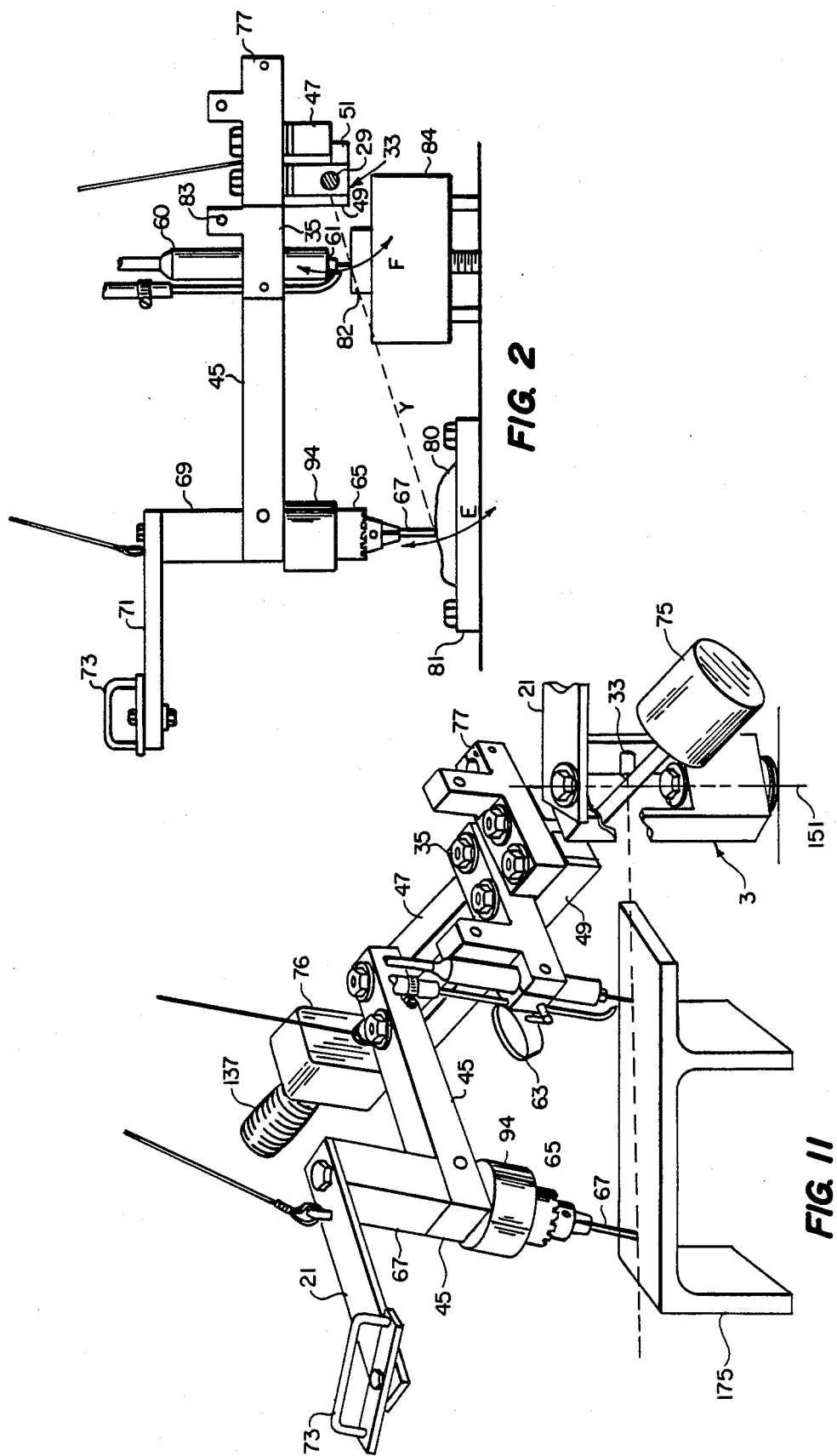

PANTOGRAPH MACHINE

RELATED APPLICATIONS

This is a continuation-in-part of parent application, Ser. No. 875,618, filed June 18, 1986, now abandoned, inventor Peter M. Pearl, and entitled, PANTOGRAPH MACHINE.

BACKGROUND OF THE INVENTION

This invention relates to pantographs or other devices for forming copies and, in particular, proportionally reduced copies, of three dimensional objects from solid blocks or blanks. Although these machines are used in a variety of applications, they are especially useful in the areas of stone and metal forming, where it may be impractical or impossible to form an exact facsimile from a mold.

Although various suitable devices exist for copying forms in two dimensions, the problems inherent in making exact copies of three dimensional models have yet to have been adequately solved. Typically, quality material removal pantograph machines are expensive, bulky and hard to manufacture. On the other hand, smaller, less expensive pantograph devices are plagued by excessive vibration, which distorts the features of the facsimiles being rendered.

These problems are particularly acute in the area of precious gem and metal cutting. Typically, these materials are very hard and, therefore, the level of vibration resulting from the cutting process is very high. Since the cost of metals and especially precious gems is high, an exacting quality of work from the machine is required if the facsimiles are to be acceptable to the purchaser. Therefore, any device utilized to cut the gemstone and metal figures must be able to duplicate the features of the larger model with the utmost of precision. Yet, the use of bulky, expensive machines to absorb the vibration is undesirable. Clearly, a lightweight, inexpensive device which has a large work area and does high quality intricate work would have considerable practical advantage over present three-dimensional pantograph designs.

The difficulty lies in designing a device in which the cutting shaft and guide shaft are maneuverable through a complete range of positions and angles, yet are sufficiently stable so as to prevent the vibration inherent in the cutting process from distorting the accuracy of the replica. In particular, three-dimensional pantographs are heavy and are typically designed so that the guide and cutting shafts are always vertically oriented. This means that an undercut, a groove or cavity cannot be cut in a blank if material overhanging the cavity is not to be cut away. In order for a pantograph to cut such a groove or cavity, the model and facsimile ordinarily must be realigned, if possible, so that no material which is to become part of the facsimile overhangs the cavity.

Although some pantograph designs provide for limited angular movement of the guide and cutting shafts which allows the overhanging material to be undercut to some extent, no suitable design exists which permits the guide and cutting shafts to be easily maneuvered through a wide range of angular movement.

SUMMARY OF THE INVENTION

The invention is a device for forming three dimensional facsimiles from a blank which is capable of maneuvering through four independent ranges of motion. As a result, the device is more easily maneuverable, and better able to cut grooves or cavities behind overhanging portions of the blank, than devices of comparable size and cost. Although the device is particularly adapted to reproduce a model in smaller size, the invention may also be used to make enlarged reproductions of a model.

The present invention's major components which generally define the ranges of motion are a support rod; a cutting arm; and a guide arm. The cutting arm and guide arm are mounted so as to be generally transverse to the support rod and are maintained in a parallel relationship one with another by a brace. Suspended from the guide arm is a guide mechanism which serves to follow or sense the configuration of the model so that its dimensions can be reproduced in the copy. Suspended from the cutting arm is a cutting mechanism whose movement is dictated by the guide mechanism so that the copy is a replica of the model, to a proportionately reduced degree. The ranges of motion provided by the present invention for the guide and cutting mechanism serve to maintain the proportionality of movement and to accomplish the undercutting and other maneuvering discussed above.

The first two ranges of motion allow the support rod to rotate about two axes of rotation which are substantially perpendicular to one another. In general, the first range of motion permits the support rod to rotate in a generally horizontal plane, while the second range of motion permits the support rod to rotate in a generally vertical plane.

The third range of motion permits the arms to rotate about a generally vertical axis with respect to the support rod. As mentioned above, the arms are maintained in a parallel relationship by virtue of the brace. Thus, the relation ship of the arms, support rod, and brace form a parallelogram, which is always maintained throughout the duplicating process by the interconnection of these elements in the present invention.

The fourth range of motion is defined by the rotation of the arms about the axis of the support rod. Again, this rotation is proportionally maintained due to the interaction of the arms, support rod, and brace.

An important advantage of the present invention lies in the ratios which are maintained for the guide mechanism with respect to the cutting mechanism. That is, certain reductions in size from the model to the copy can be maintained due to these ratios. For example, depending upon any particular ratio, the copy can be one-third, one-fourth, one-fifth, etc., the size of the model. These ratios are maintained because of the careful alignment of the present invention. For example, the guide mechanism, cutting mechanism, and vertical axis of rotation of the support rod form a straight line, which is maintained throughout the duplicating process. Likewise, the tip of the guide mechanism, the tip of the cutting mechanism, and the horizontal axis of rotation of the support rod also form a straight line. The location of the cutting mechanism along these lines determines the proportionate reduction in the size of the copy. Thus, several cutting arms of varying sizes can be utilized with the present invention in order to vary the size of the copy.

The present device advantageously includes three counterbalance weights. The first of the counterbalance weights is secured to the support rod opposite the intersection of the rod's axes of rotation from the mount.

The second of the counterweights is secured to the support rod opposite the mount from the first counterweight. The third counterweight is secured to the end of guide arm proximate the guide mechanism.

A pair of dampeners are advantageously interconnected with each arm in order to dampen vibration during the cutting process, thus rendering a more clear and attractive copy. Each of the dampeners includes a first shaft rotatable about its axis secured to a fixed support, and a second shaft perpendicular to the first shaft and secured thereto, rotatable about its axis. A link is secured to the second shaft and is rotatable about an axis perpendicular to the axis of the second shaft and is rotatably connected to one of the arms of the device.

Advantageously, the device is provided with a sensing mechanism which identifies when the cutting shaft has cut away approximately the correct amount of material from the blank.

DESCRIPTION OF THE DRAWINGS

These and other features in the invention will be described with reference to drawings of the preferred embodiment which is intended to illustrate, and not to limit, the invention, and in which:

FIG. 2 is a partial perspective view illustrating the relationship of the guide and cutting arms of the device of FIG. 1 taken along 2—2 of FIG. 3;

FIG. 11 is a perspective view of the duplicating device of FIG. 1 illustrating the alignment of the guide-head and cutting head.

DETAILED DESCRIPTION OF THE INVENTION

Figure 1:
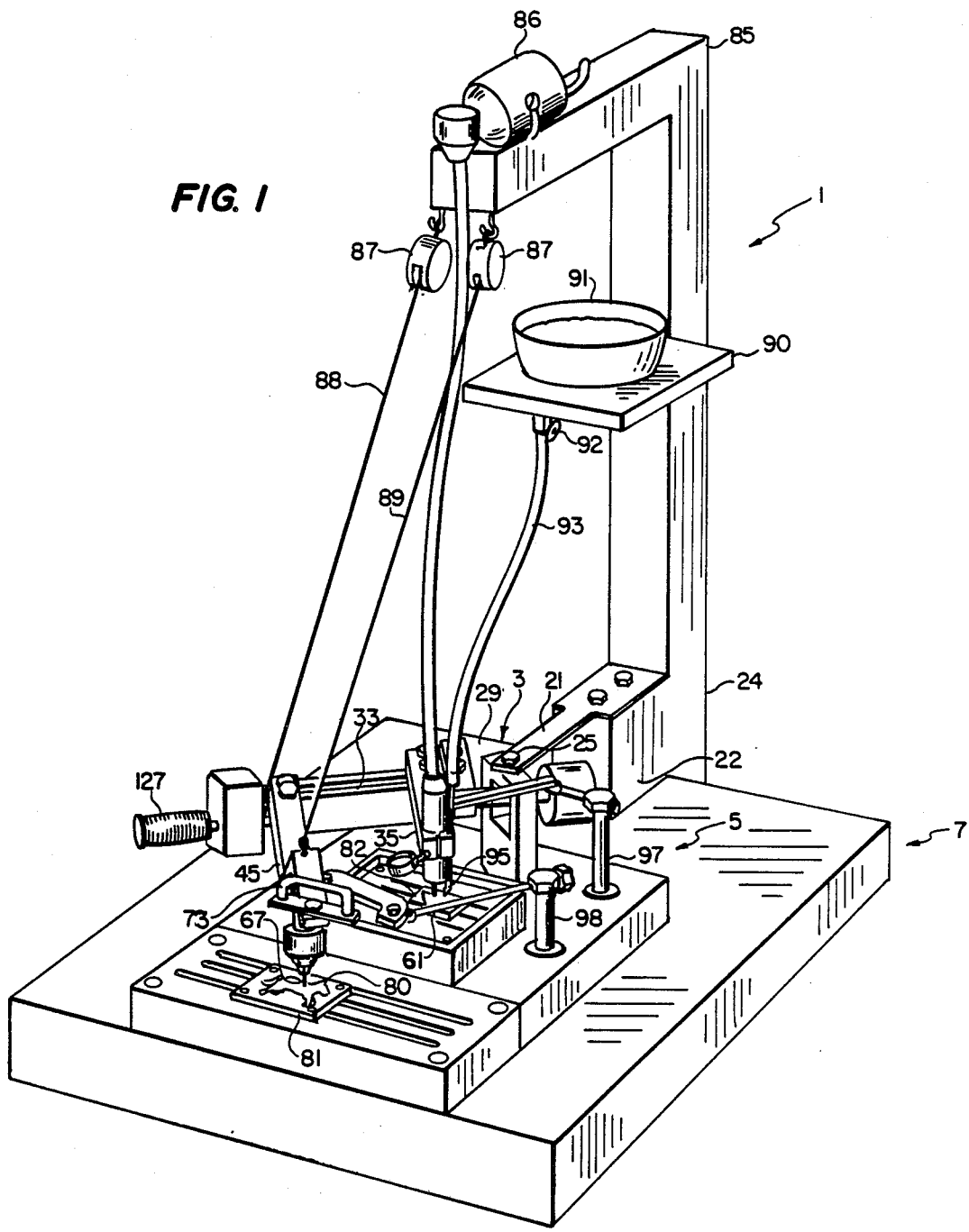
FIG. 1 is a perspective view of the duplicating device of the present invention.

Referring to FIG. 1, there is shown a pantograph machine 1 drawn in accordance with the principles of the present invention. The machine is useful in using a model 80 as a guide for constructing a proportionally reduced copy 82 of the model 80 from a solid block of material or work piece. In the case of FIG. 1, a three-dimensional horse serves as the model 80, and a copy 82 of about one third size is being constructed by the pantograph 1.

It should be understood, however, that models of all shapes and sizes can be utilized with the present invention, and that the size of the copy can be varied widely. As described in more detail below, the principles of the present invention allow three-dimensional copying of the model with a great degree of accuracy and clarity, including the use of undercutting to provide unusually striking aesthetic effects.

As shown in FIG. 1, the major components of the present invention are the guide arm 45 and the cutting arm 35 which are attached to a mount 33 rotatably secured to a support rod 29. A handle 137 is provided on the distal end of the rod 29, and a second handle 73 is mounted on the guide arm for providing manual manipulation of the arms 35 and 45.

A guide head or shaft 67 is suspended from the guide arm 45 and a cutting head or shaft 61 is suspended from the cutting arm. The guide shaft 67 is manually manipulated by the handles 137 and 73 to follow the configuration of the model, while the present invention transmits the movements of the guide shaft 67, to a proportionately reduced degree, to the cutting shaft 61. Thus, the guide shaft 67 is a sensing mechanism which explores the three-dimensional characteristics of the model 80 and transmits them to the copy 82, which is cut out or ground out of the work piece by the cutting shaft 61. The interaction between the pivot 3, guide arm 45, cutting arm 35, mount 33, and head rod 29 provide virtual universality in movement for the guide shaft 67 and cutting shaft 61. Thus, even minute details in the model are capable of reproduction in the copy.

The rod 29 is mounted for rotation in two directions about a pivot 3 which is partially supported by a block 2. The block 22 in turn supports a vertical post 24 having a horizontal bar 85 at the top thereof.

Still referring to FIG. 1, the horizontal bar 85 supports a drive mechanism 86 for the cutter 60. The drive mechanism 86 is electrically interconnected with the cutter 60 by a cable 158. A pair of spring loaded reels 87 are also supported by the bar 85. A cable 88 from one of the spring loaded reels 87 is secured to the support rod 29 between the mount 33 and the counterweight 77, and a cable 89 from the other reel 87 is secured to the extension plate 71. The tension of the spring loaded cables helps to counterbalance the weight on the support rod.

Beneath the horizontal bar 85 is a platform 90 which supports a coolant reservoir 91. A valve 92 connects the coolant reservoir 91 to a coolant line 93 to a coolant nozzle 95 which terminates near the point of the cutting shaft 61. A drain (not shown) is provided in the support 5 for draining off the coolant fluid.

The model 80 and blank 82 rest on a raised work area or pedestal, 5 which is in turn mounted on a table 7 or other suitable work bench. Two dampeners 97 and 98 are mounted on the pedestal 5 and are interconnected with each arm.

The Pivot, Support Rod, and Arms

Figure 8:
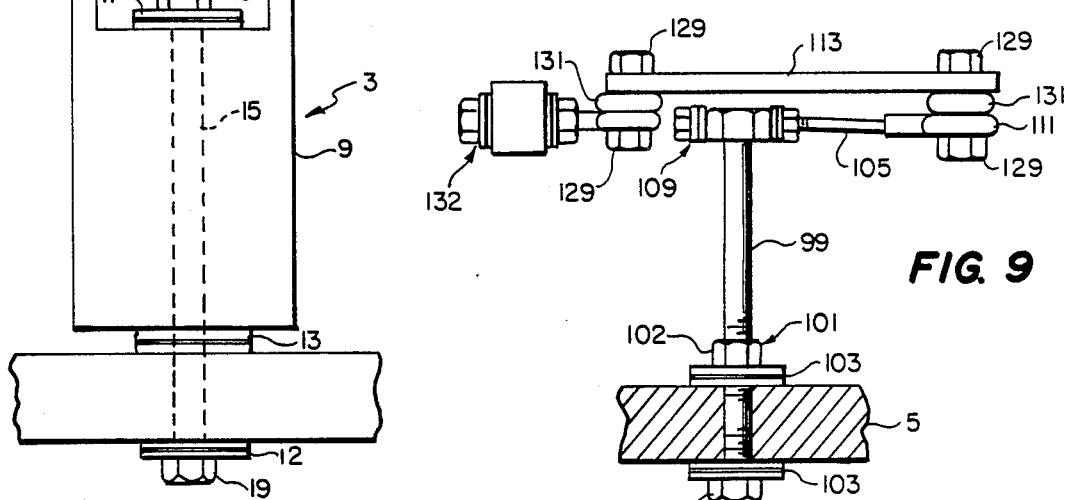
FIG. 8 is an enlarged partial sectional view illustrating the pivot of the device of FIG. 1.

As shown in detail in FIG. 8, the pivot 3 provides a rotatable mounting for the rod 29 (shown in cross-section). The pivot 3 includes a vertically oriented, elongate, generally rectangular body 9 which includes a large generally rectangular aperture 11 at its upper end. The pivot 3 is useful in the present invention in providing movement for the rod 29 about at least two axes. The body 9 of the pivot 3 rests upon a thrust bearing 13 and is rotatably secured thereto by means of a pin 15 which extends through the pedestal 5, the thrust bearing 13 and the body 9 to the lower end of the aperture 11. One of a pair of nuts 19 is secured to either end of the pin 15 to hold it firmly in place. To ensure that the nuts 19 do not interfere with the rotation of the body 9 upon the thrust bearing 13, a pair of thrust bearings 17 are positioned over the pin 15 between each nut 19. The pin 15 is useful in the present invention in that it provides for movement about a vertical axis 151.

The upper end of the body 9 is rotatably secured to a fixed support plate 21. As shown in FIG. 1, the plate 21 is secured to a support block 22 which is fixed to the table 7. A pin 23, shown in FIG. 8, extends through a hole in the support plate 21 and the body 9 along the extended axis 151 of the pin 15 and is secured, at either end by a pair of nuts 25. A pair thrust bearings 27 located against the top and bottom surfaces of the plate 21 permit the free rotation of the body 9 relative the Plate 21.

As further shown in FIG. 8, a support rod 29 is rotatably secured by a pair of rotatable gripping projections 31 within the aperture 11 at the point of intersection of the axis of rotation of the pins, 15 and 23, and the axis of rotation of the gripping projections 31. The projections 31 extend inwardly from the sides of the aperture and are rotatable about an axis which is perpendicular to the axis 151 of the pins, 15 and 23. The projections are useful in the present invention in that they provide for movement about a horizontal axis. Thus secured, the rod 29 is rotatable about the axis of the pin 15 to provide movement in a horizontal plane, and is also rotatable about the axis of the gripping projections 31 to provide movement in a vertical plane.

Figure 3:
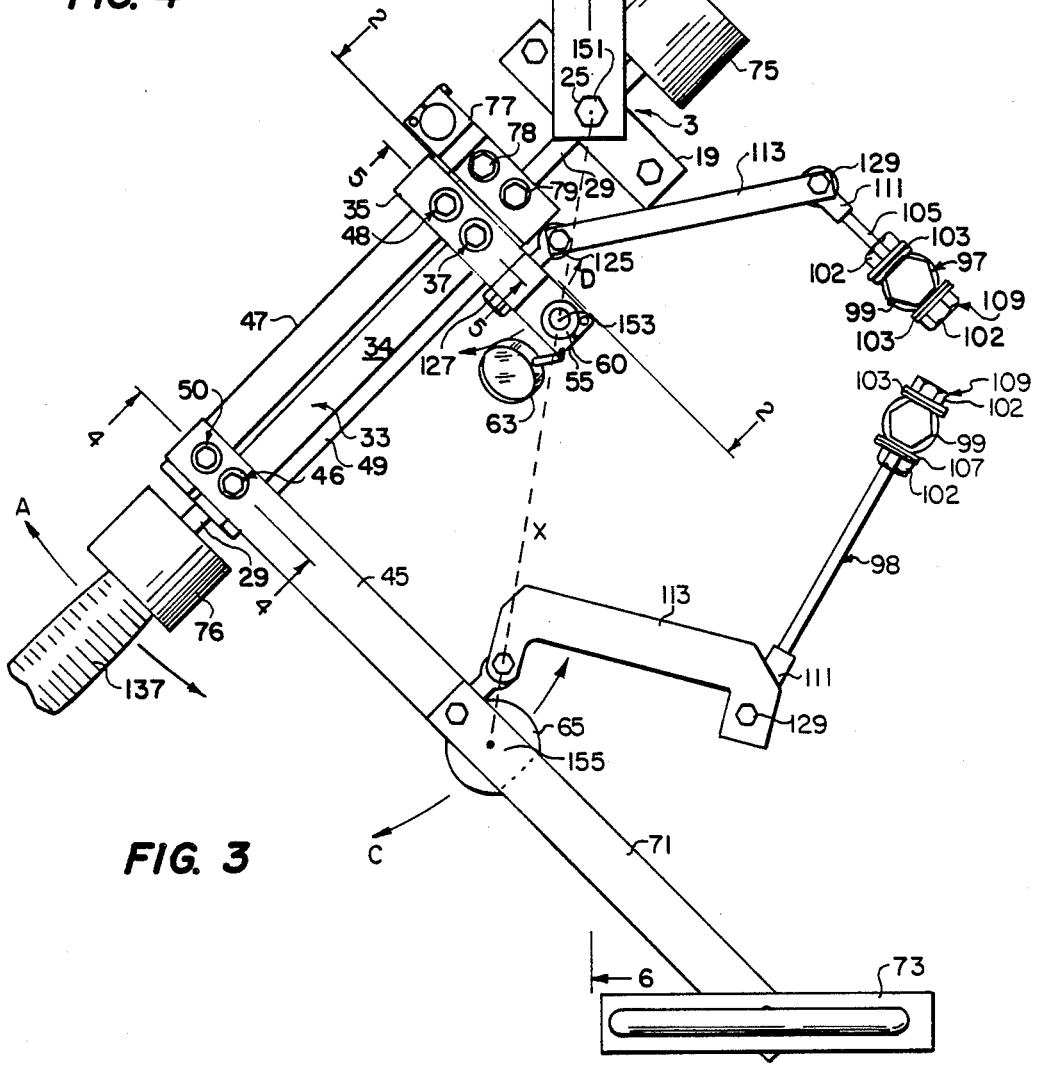
FIG. 3 is a partial top elevational view of the device of FIG. 1.
Figure 7:
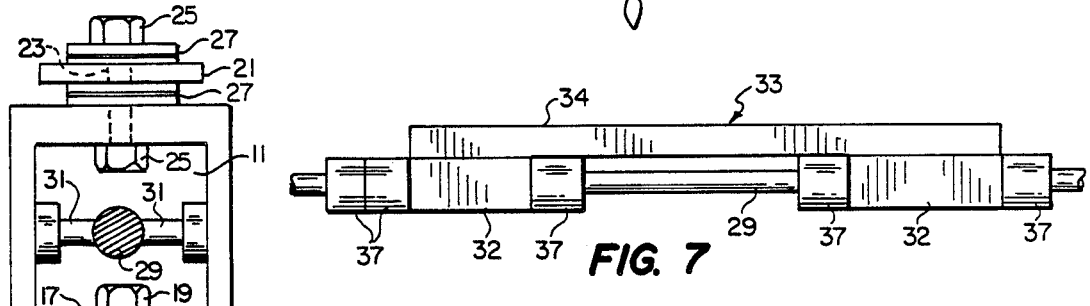
FIG. 7 is a partial side view illustrating the configuration of the mount of the device of FIG. 1.

As shown in FIG. 3, an elongate mount 33 is rotatably secured along the length of the rod 29. The mount 33 is useful in the present invention in that it provides for movement for the arms 48 and 35, which are appended thereto, about the axis of the rod 29. As shown in the side view of FIG. 7, the mount 33 includes a pair of box-shaped bushings 32 secured to an elongate plate 34. A group of cylindrical axial locators 37 fixed to the rod 29 at either end of each bushing 32 prevents the mount 33 from moving axially relative to the rod 29.

Figure 5:
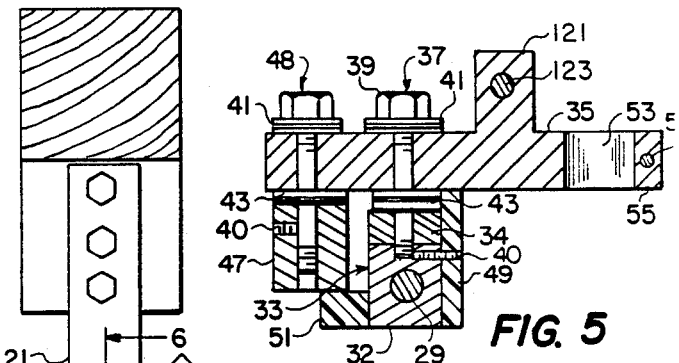
FIG. 5 is a partial sectional view taken along 5—5 of FIG. 3.

As shown in FIGS. 3 and 5, a rigid, generally rectangular cutting arm 35 is secured to one end of the mount 33 by means of a bolt and double thrust bearing assembly 37. Referring to FIG. 5, the bolt and double thrust bearing assembly 37 includes: a pin or bolt 39 which extends through the cutting arm 35, through the plate 34 and into the mount 33; a first thrust bearing 41 located between the head of the bolt 39 and the cutting arm 35. A second thrust bearing 43 located between the cutting arm 35 and the mount 33, and a set screw 40 for securing the position of the bolt 39.

Figure 4:
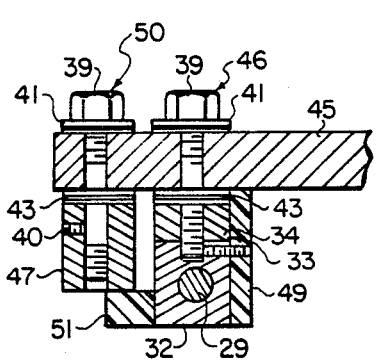
FIG. 4 is a partial sectional view taken along 4—4 of FIG. 3.

As shown in FIGS. 3 and 4, a rigid, generally rectangular guide arm 45 is secured to the other end of the mount 33 by means of a bolt and double thrust bearing assembly 46 similar to that which is used to secure the cutting arm 35 to the mount 33.

As shown in FIGS. 3, 4, and 5, a rigid, generally rectangular brace 47, in conjunction with the mount 33, holds the cutting arm 35 and the guide arm 45 parallel to one another, and is itself parallel to the mount 33. The brace is secured to the end of the cutting arm 35 and the guide arm 45 by means of a pair of bolt and double thrust bearing assemblies, 48 and 50, similar to those used to secure the arms 35 and 45 to the mount 33. The brace 47 assures that as the arms 45 and 35 rotate relative the mount 33 about the axes of their respective bolt and double thrust bearing assemblies, 46 and 37, they will always be parallel to one another. That is, as the guide arm 45 is moved about the model 80, its movement about the bolt and thrust bearing assembly 46 is transmitted to the cutting arm 35 by the brace 47.

For example, with particular reference to FIG. 3, when the guide arm 45 is rotated about its bolt and thrust bearing assembly 46, as indicated by the arrow C in Figure 3, this movement causes the brace 47 to move either toward or away from the pivot 3. At the same time, this longitudinal translation of the brace 47 is transmitted to the cutting arm 35, maintaining the latter in a parallel relationship with the guide arm 45 in causing rotation of the guide arm 35 about its bolt and thrust bearing assembly 37 to a proportionate degree as the rotation in guide arm 45.

Referring still to FIGS. 3, 4, and 5, an elongate, rectangular nylon plate 49 and an elongate square block 51 are utilized to facilitate the fluid movement of the arms, 35 and 45, brace 47, and mount 33 relative to one another. The plate 49 is shown extending parallel to and adjacent the mount 33 in FIG. 3. The block 51, although also elongate and extending parallel to the mount 33, is shown only in cross-section in FIGS. 4 and 5. The large planar surface of the nylon plate 49 is secured in an upright fashion to the mount 33 opposite the brace 47 so that the upper edge of the plate 49 contacts the arms, 35 and 45. The upper surfaces of the block 51 is secured to the opposite side of the mount 33 adjacent to and below the brace 47 so that the upper surface of the blocks contacts the bottom surface of the brace 47.

Therefore, in order for the guide arm 45 and cutting arm 35 to rotate about their respective bolt and thrust bearing assemblies 46 and 37, as shown in FIG. 3, the small but significant force of friction created by the sliding of the arms, 35 and 45, over the surface of the nylon plate 49, will need to be overcome. Likewise, the small but significant force of friction created by the sliding of the brace 47 relative the blocks 51 must be overcome Thus, the friction created by the nylon prevents the arms from moving loosely, yet permits the arms to be moved with a minimum of force. In addition, these nylon elements 49 and 51 assist the present invention in reducing vibration and may result in inaccuracies in the reproduction of the model.

Figure 6:
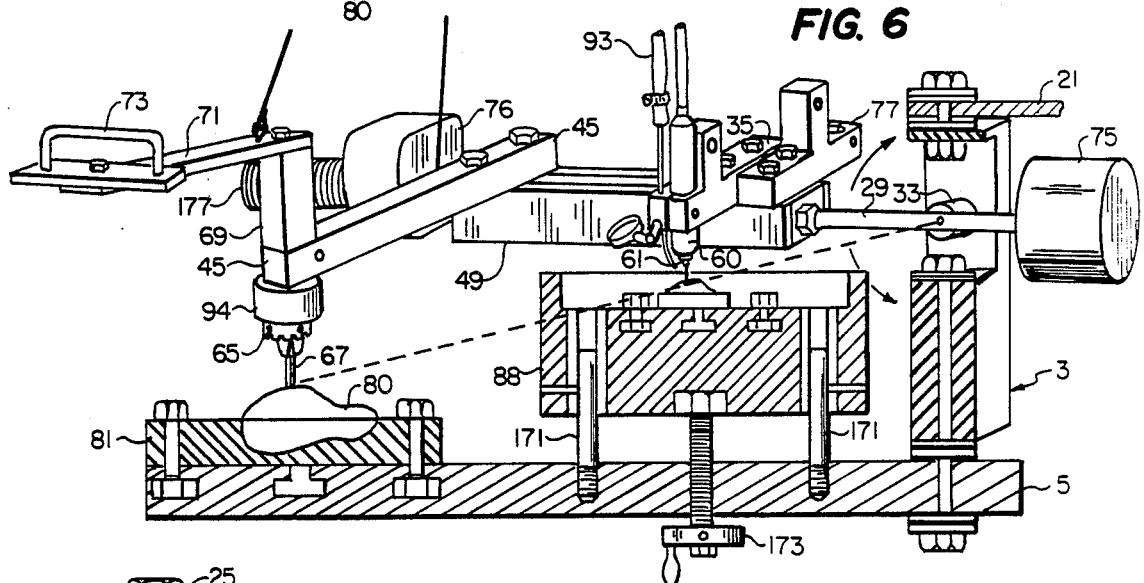
FIG. 6 is a partially cutaway perspective view of the device of FIG. 1.

Referring to FIGS. 5 and 6, a cylindrical bore 53 is shown formed near the distal end of the cutting arm 35 in order to receive the cylindrical cutter 60. In Figure 5, the cutter 60 has not yet been inserted into the bore 53, while FIG. 6 illustrates the positioning of the cutter 60 within the bore 53. The axis of the bore 53 is parallel to the axis of rotation of the bolt and thrust bearing assemblies 37 and 48. The extreme distal end of the cutting arm 35 is slotted, as shown in FIGS. 5 and 6, to permit the diameter of the bore 53 to be varied when installing the cutter 50. Once installed, a screw is horizontally inserted into a hole 57, which tightens the bore 53 about the cutter 60 in order to secure it in place.

The cutter 60 includes a generally cylindrical cutting shaft 61, having an axis 153, which is secured in a position parallel to and in a single plane with the axes of rotation of the bolt and the double thrust bearing assemblies, 37 and 48.

Advantageously, the device 1 includes a magnifying glass 63 adjustably secured to the end of the cutting arm 35 proximate the cutter 61 to better permit the cutting process t be viewed.

As best shown in FIGS. 2 and 6, a counterweight 94, having a generally cylindrical body, is secured to the bottom of the guide arm 45. A guide shaft receiving mechanism 65, resembling the bit-receiving head of a drill, is secured to the bottom of the counterweight 94. A guide shaft 67 secured within the mechanism has an axis 155 parallel to and contained in a single plane with the axis 153 of the cutting shaft 61 and the axis 151 of the pin 15. As will be explained in more detail below, the line (shown in FIG. 2), which includes the point, or head, of the cutting shaft 61 and the point, or head, of the guide shaft 67, also includes the intersection of the axes of the pin 15 and the projections 31.

As shown in FIGS. 2 and 6, in order to facilitate the manipulation of the guide arm 45, an elongate extension plate 71 is secured to a spacer block 69 located above the guide arm 45 proximate the mechanism 65. The extension plate is advantageously provided with a handle 73 rotatably secured to the end of the plate 71 opposite the spacer block 69. The spacer block 69 spaces the extension plate 71 from the support 5 and thereby permits the guide arm 45 to be moved through a wider range of movement without contacting the support 5.

The Counterweights

The counterweight 94, secured to the bottom of the guide arm absorbs vibration created by the cutting process. In addition, as best shown in FIGS. 3 and 6, the device is provided with a pair of vibration absorbing counterweights secured to the support rod 29.

A first generally cylindrical counterweight 75 is mounted on the end of the support rod 29 extending through the pivot 3 opposite the mount 33. A second generally cylindrical counterweight 76 is located at the end of the support rod 29 proximate the guide arm 45 opposite the mount from the first counterweight 75. In order to permit the convenient manipulation of the support rod, a handgrip 137, similar in shape to those used on bicycle handlebars, is secured to the end of the support rod 29 proximate the counterweight 76.

A Second Cutting Arm Referring to FIG. 3, the device 1 is advantageously provided with a second cutting arm 77 for producing facsimiles of a different scale than that produced when cutting arm 61 is utilized. This second cutting arm 77 is located adjacent to and parallel to the first cutting arm 35, as shown in FIG. 3. However, the bore 53 of the second cutting arm 77 is on the opposite side of the mount 33 as the bore 53 of the cutting arm 35. In order to be placed into operation, the cutting arm 77 is turned so that its bore 53 is on the same side of the mount 33 as the bore 53 of the first cutting arm 35.

When the arm 77 holds the cutter 60 during the cutting operation, the straight line X, shown in FIG. 3, containing the axis of the cutter 60 and the axis of the guide shaft receiving mechanism 65 also includes the intersection of the axis of the projections 31 and the axis of the pin 15. Furthermore, when the arm 77 is used to hold the cutter 60, and the axis of the cutter 60, the guide shaft receiving mechanism 65 and the pin 15 are parallel to one another and are contained within a single plane. This alignment is also maintained whether cutting arm 35 or cutting arm 77 is being utilized. The significance of this alignment will be discussed in greater detail below.

When not being used as a cutting arm, the second cutting arm 77 advantageously can be secured to the mount 33 and brace 47 in order to further stabilize the device. As shown in FIG. 3, the alternative cutting arm 77 is secured to the mount 33 and the brace 47 parallel the cutting arm 35 by means of bolt and double thrust bearing assemblies, 78 and 79, the axes of rotation of which form a parallelogram with the axes of rotation of the assemblies, 37 and 48, securing the cutting arm 35. When being used as a stabilizer, the cutter receiving bore of the alternative cutting arm 77 extends opposite that of the cutting arm 35 being utilized so as not to block the view of the cutting area.

The Molds

As seen in FIGS. 1, 2 and 6, a model 80 is secured within a half-mold 81 affixed to the support 5 and centered beneath the guide shaft 67 in front of the pivot 3 with suitable fasteners. Likewise, a blank 82 from which a replica is to be cut is secured within a half-mold 83 centered beneath the cutting shaft 61. This permits the guide and cutting shafts to reach any point on the model or blank which is accessible from a vertical direction, as well as to undercut these points, if so desired, by inserting the guide and cutting shafts beneath these points from a wide variety of positions and angles.

The Dampeners

Figure 9:
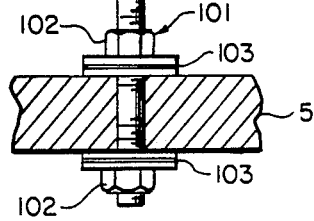
FIG. 9 is an enlarged partial elevational view illustrating one of the dampeners of the device of FIG. 1.

As shown in FIGS. 1 and 3, the device 1 advantageously includes a pair of dampeners, 97 and 98. As best seen in FIG. 9, the dampeners include a vertical bolt or shaft 99 rotatably secured to the support 5 by a double nut and thrust bearing assembly 101. The double nut and thrust bearing assembly 101 includes a pair of nuts 102 secured over the shaft 99 on either side of the support 5 and a pair of thrust bearings 103 positioned over the shaft 99 between the support 5 and each of the nuts 102. The assembly 101 fixes the shaft 99 to the support 5, yet permits the shaft 99 to rotate about its vertical axis.

A horizontal shaft 105 is rotatably secured to the vertical rod 99 by means of a similar double nut and thrust bearing assembly 109. A rod end 111 is secured to the end of the horizontal shaft 105 distal the vertical shaft 99. The rod end 111 is secured to a link 113 by means of a pin and a pair of nuts 117.

As shown in FIG. 1, the dampener 97 is advantageously secured near the back of the support 5 to the cutter side of the pivot 3 so that the dampener will not interfere with the movement of the arms, 35 and 45.

As best seen in FIGS. 3 and 5, the cutting arm 35 advantageously includes a vertical projection 121 containing a horizontal bore 123 perpendicular to the axis of the arm 35, in which a rod end 125 is secured by means double nut and thrust bearing assembly 127. The elongate rectangular plate-shaped link 113 of the dampener 97 is secured to the rod end 125 by means of a pin and pair of nuts 129. In order to ensure that the dampener 97 does not restrict the free movement of the arm 35, a pair of thick resilient gaskets 131, not visible in FIGS. 3 and 5, but the position of which is shown in FIG. 9, spaces the link 113 from the rod ends, 111 and 125.

Referring again to FIG. 1, the dampener 98 is advantageously secured to the edge of the support 5 to the side of the mold 83. The arm 45 preferably contains a bore 133 perpendicular to the axis of the guide shaft 67 in which an rod end 135 is secured by a double nut and thrust bearing assembly 137. The link 113 of the dampener is secured to the rod end 135 by means of a pin and a pair of nuts 139. It has been found that due to the size of the guide shaft receiving mechanism 65, the link 113 of the dampener 98 is preferably generally C-shaped so that the link does not inhibit the movement of the arm 45. In order to further ensure that the dampener 98 does not restrict the movement of the arm 45, a pair of thick resilient gaskets 131, not shown in FIG. 3, but the position of which is shown in FIG. 9, spaces the link 113 from the rod ends, 111 and 135.

As the vibration due to the cutting process is transmitted from the arms 35, 45 to the links 113, the gaskets 131 separating the rod ends 125 from the link 113 absorb a portion of the vibration. As the vibration is further communicated from the links 113 to the rod ends 11, the gaskets 113 between the links 113 and the rod ends 111 absorb yet more of the vibration. Furthermore, since the shafts constrained against movement other than in a plane parallel to the pedestal 5, they largely eliminate any vibration.

Analysis of the Ranges of Motion

In order to better clarify the manner in which the device 1 is able to render accurate reduced copies of the model 80 located within the mold 81, the ranges of movement of the device will be discussed individually.

1. First Range of Motion

The first range of movement is defined by the rotation of the support rod 29 about the substantially vertical axis of the pin 15. However, it should be pointed out that the first range of movement is not necessarily limited to a vertical axis. As indicated by arc A in FIG. 3, the rotation of the support rod 29 about the pin 15 will result in a movement of the guide arm 45 and an identical, proportionally reduced, movement of the cutting arm 35. As shown in FIG. 3, in order to maintain the proportionity of movement as rod 29 rotates about axis 151 of pin 15, the axis 153 of the cutting shaft 61, the axis 155 of the guide shaft and the axis 151 of the pin 15 are aligned in a straight line X. This proportion is equivalent to the ratio of the distance between the axis of the pin and axis of the cutting shaft to the distance between the axis of the pin 15 and the axis of the guide shaft along the same line.

2. Second Range of Motion

The second range of movement is defined by the rotation of the support rod 29 about the substantially horizontal axis of rotation of the projections 31. However, it should be pointed out that the second range of movement is likewise not limited to a horizontal axis. As indicated by arc B in FIG. 6, the rotation of the support rod 29 about the axis of rotation of the projections 31 will result in a movement of the guide shaft 47 and an identical proportionally reduced movement of the cutting shaft 61. In order to maintain this proportionality of movement, the point of the guide shaft 47, the point of the cutting shaft 61 and the point of intersection of the axis of the pin 15 and the axis of rotation of the projections 31 are aligned in a straight line Y, shown in FIG. 2. This proportion is equivalent to the ratio of the distance between the point of the cutting shaft and the point of intersection of the axis of the pin 15 and the axis of rotation of the projections 31 to the distance between the point of the guide shaft and the point of intersection of the axis of the pin 15 and the axis of rotation of the projections 31.

3. Third Range of Motion

The third range of motion is defined by the arcs transcribed by the cutting arm 35 and the guide arm 45 as they rotate about their bolt thrust bearing assemblies 37 and 46, respectively, relative to their respective junctions with the support rod 29. In the case of the guide arm 45, this rotation is indicated by the arc C shown in FIG. 3. Because of the interaction of the arms 35 and 45, and brace 47, the rotation of the guide arm 45 in the arc C is transmitted to a proportionally reduced degree to the cutting arm 35.

This proportionality is maintained by the equivalency of the angles of the arms 35 and 45 with respect to the support rod 29. For example, referring to FIG. 3, the angle formed between the guide arm 45 and the support rod 29 is equivalent to the angle formed by the cutting arm 35 and the support rod 29 as the duplication of the model is accomplished.

Therefore, the movement of the guide shaft 45 relative the mount 33, as indicated by arc C, will be accompanied by an identical proportionally reduced movement of the cutting shaft 35 relative the mount 33, as indicated by arc D. The proportion is equivalent to the ratio of the distance between the axis of rotation of the cutting arms 35 relative the support rod 29 and the axis of the cutting shaft 153 to the distance between the axis of rotation of the guide am 45 relative the support rod 29 and the axis of the guide shaft.

4. Fourth Range of Motion

The fourth range of motion is defined by the rotation of the cutting arm 35 and the guide arm 45 as they rotate about the axis of the support rod 29. Referring to FIG. 2, the movement of the point of the guide shaft about the axis of the support rod, as indicated by arc E, is accompanied by an identical proportionally reduced movement of the point of the cutting shaft about the axis of the support rod, as indicated by arc F. The proportion is equivalent to the ratio of the distance between the axis of the support rod and the point of the cutting shaft to the distance between the axis of the support rod and the point of the guide shaft.

The guide shaft, the cutting shaft and the cutting arm are positioned and aligned so that the above mentioned ratios are equivalent to one another. Therefore, the movements of the guide point will always be mirrored by identical, proportionally reduced, movements of the cutting point. This means that to create an accurate proportionally reduced copy of a model, it is simply necessary to bring the point of the guide shaft into contact with all points of the model figure. This, in turn, will cause the cutting shaft to cut away all undesired portions of the blank, thereby carving an exact facsimile of the model figure.

Advantageously, cutting arms of various predetermined lengths are provided for the device. Likewise, a set of corresponding bores in the mount 33 in the brace 47 are provided for each cutting arm, thus greatly facilitating the proper alignment of the components of the device.

Due to the unique configuration of the device, the remaining components of the device can be readily aligned.

Operation

The operation of the device will now be briefly described.

Initially, the half mold 81 which contains the model from which the reduced replica is to be rendered is affixed to the support 5 in line with the support arm 85 and centered beneath the guide shaft 67 by means of suitable fasteners. That is, the model is centered beneath the guide shaft 67 when the arms, 35 and 45, the mount 33, and the brace 47 form a rectangle. This ensures that the guide arm will be able to move freely with the greatest range of motion over the model 80.

The half mold 83 is likewise secured to a vertically adjustable work platform 84. As shown in FIG. 6, the work platform 84 is secured against horizontal movement by a number of vertical rods 171 and can be adjusted vertically by means of a suitable jack 173.

Referring now to FIG. 11, in order the ensure the correct alignment of the cutting shaft 61 and the guide shaft 67, an alignment platform 175 is positioned over the model 80 and the blank 82 so that the plane containing its upper surface also includes the axis of rotation of the projection 31. The support rod 29 is maneuvered so that the point of the guide shaft 67 contacts the upper surface of the alignment platform 135 and the cutter 60 is maneuvered within the bore 53 of the cutting arm 35 so that the point of the cutting shaft also contacts the upper surface of the alignment platform. The screw within the tapped bore 57 is then tightened in order to secure the cutter firmly in position.

The handle 73 is raised so that the cutting shaft 61 will be raised above the surface of the blank 82. The cutter 60 is activated and the valve 92 to the coolant reservoir 91 is opened. By grasping the handgrip 39 and the handle 73, the guide shaft can be moved over the exposed surface of the model 80. As the guide shaft 67 moves over the contours of the model, the point of the cutting shaft 61 cuts away the portions of the blank which will not be included in the replica. Because of the great ease with which the device can be maneuvered, and because of its stability, the replica rendered will be an exceptionally accurate reduced copy of the original model. When the guide shaft is able to contact the entire exposed surface of the model, the cutting shaft will have cut away all undesired portions of the blank and will have cut out half of an almost perfect reduced replica of the model.

No one single range of movement permits the device to render an exact facsimile of the model figure, rather it is the combination of all four ranges of movement which permit the device to so closely replicate the model. For example, as can be seen from FIG. 2, it is not merely the ability of the arms, 35 and 45, to rotate about the axis of the support rod 29 which permits the device to sharply undercut those portions of the model distal the support rod. It is, in fact, the combined effect of the four ranges of motion which gives the device this capabiltiy. As perhaps most easily visualized from viewing FIG. 6, these portions can be undercut by rotating the support rod 29 about the axis of the pin 15 to a position roughly above the portion to be cut out, by lifting the support rod so that it rotates about the axis of the projections 31, and by rotating the arms, 35 and 45, about the axis of the support rod 29 so that the respective shafts, 61 and 67, are at an angle so as to be able to sharply undercut the model and copy. Finally, the ability of the arms to rotate about their respective axes of rotation relative the mount permits the guide shaft to be brought into contact with the desired portion of the figures.

After the blank is examined to ensure that no area of the blank which should have been cut away has been inadvertently left intact, the blank 82 is removed from the work platform 84 and a half mold 182 is made of the upper portion of the blank 82. The other half of the mold 81 of the model 80 is then secured to the support 5 by suitable fasteners. The half mold 182 is placed on the work platform. The guide shaft 67 is brought into contact with the mold 81 secured to the support 5. The height of the work platform 84 is then adjusted so that the end of the cutting shaft 61 is brought into contact with the mold 182. The mold 182 is then positioned so that as the tip of the guide shaft 67 traces the edge of the model 80, the tip of the cutting shaft 61 will trace the impression of the half formed replica in the mold 182. Thus positioned, the mold 182 is secured to the work platform 84 by suitable fasteners. The cutting process is then continued as before.

Sensing Mechanism

Figure 10:
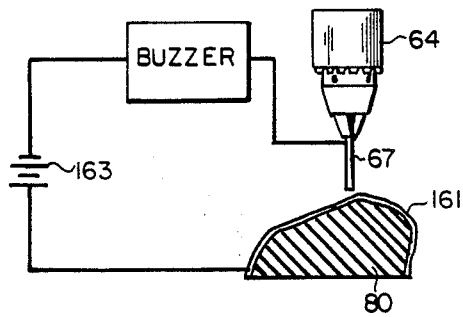
FIG. 10 is a schematic view illustrating the sensing mechanism of the device of FIG. 1.

Since the cutting process often takes a considerable length of time, the device is advantageously provided with a sensing mechanism shown schematically in FIG. 10, consisting of: a sheet of aluminum foil which is placed over the exposed portion of the model figure; an electrical connection connecting the sheet of aluminum foil with a power source; an alarm mechanism, such as a buzzer; and an electrical connection secured to the conductive guide shaft. When the cable 89 (shown in FIG. 1) secured to the extension plate is released, the weight on the guide arm is sufficient to bring the guide shaft into contact with the model. Therefore, once the cutting shaft has begun forming a bore in the blank, the device will cut away the undesired portion of the blank without pressure being manually applied to the device. During this process, a relatively larger diameter cutting shaft 61 can be utilized in order to accelerate the cutting process. Once the guide shaft contacts the sheet of aluminum foil, the circuit connecting the buzzer and the power source will be completed and the buzzer will sound. Since the sheet of aluminum foil supports the guide shaft above the surface of the model, the cutting shaft will always cut away just slightly less than the desired amount of blank necessary to form the replica, at which point a smaller diameter cutting shaft can be inserted to facilitate the precision cutting operation.

The use of the sensing mechanism permits a single operator to run numerous machines, thus greatly increasing productivity.

Alternative Embodiment

Figure 12:
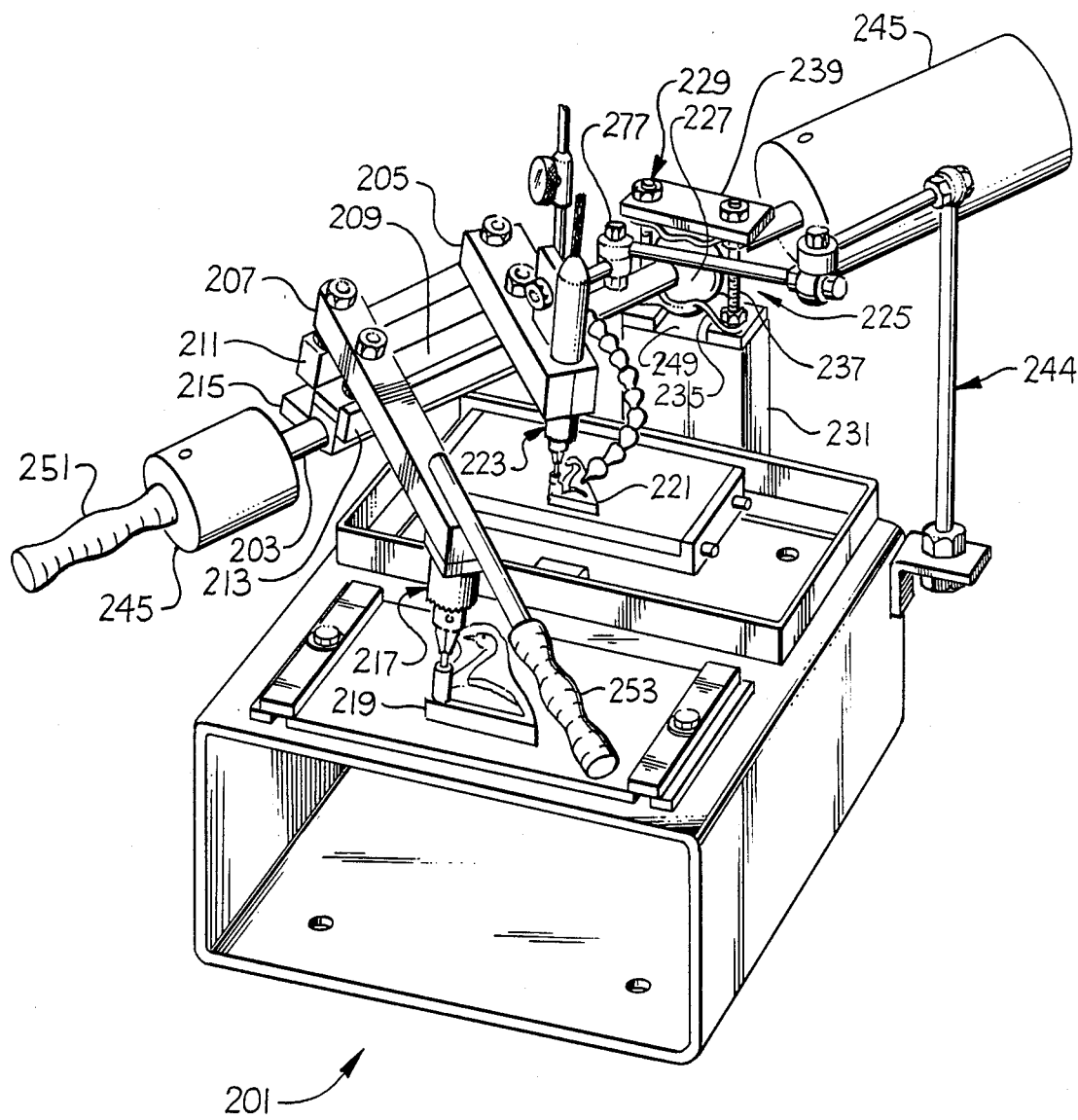
FIG. 12 is a perspective view of an alternative embodiment of the duplicating device of the present invention.
Figure 13:
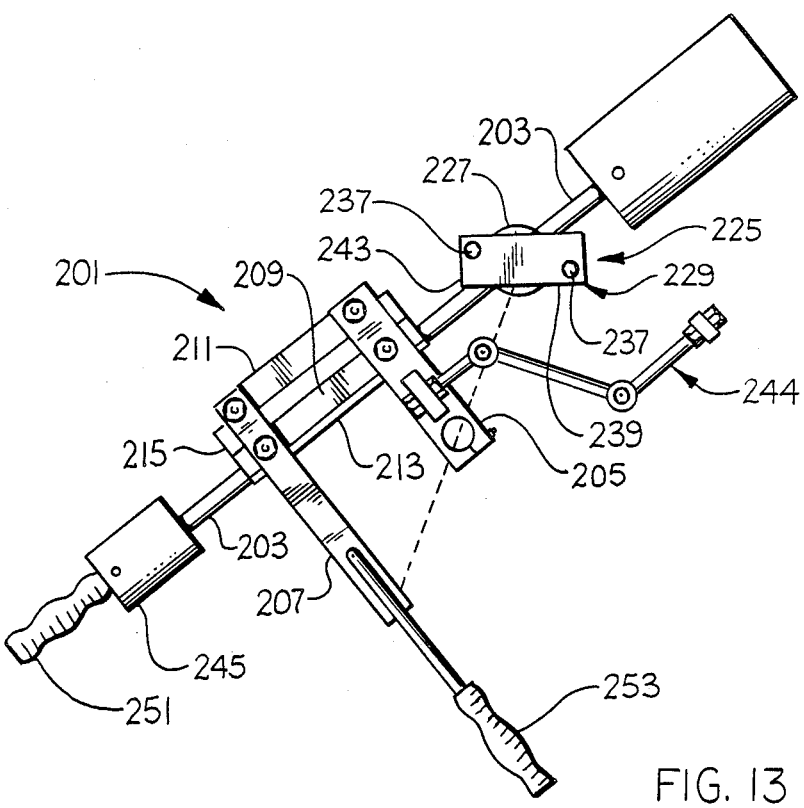
FIG. 13 is a top view of the device of FIG. 12.

An alternative embodiment of the invention will now be described with reference to FIGS. 12-15. Referring to FIGS. 12 and 13, there is shown a pantograph machine 201 having a support rod 203, a cutting arm 205 and a guide arm 207. The cutting arm 205 and the guide arm 207 are secured to a mount 209 so as to be generally transverse to the support rod 203 and are maintained in a parallel relationship with one another by a brace 211. As in the embodiment described above, an elongate rectangular nylon plate 213 and an elongate block 215 are utilized to facilitate the fluid movement of the brace, mount and arms, relative one another.

Referring now to FIG. 12, suspended from the guide arm 207 is a guide mechanism 217 which serves to follow or sense configuration of a model 219 so that its dimension is can be reproduced in a copy 221. Suspended from the cutting arm 205 is a cutting mechanism 223 whose movement is dictated by the guide mechanism 217 so that the copy 21 is a replica of the model 219, to a proportionately reduced degree.

Figure 14:
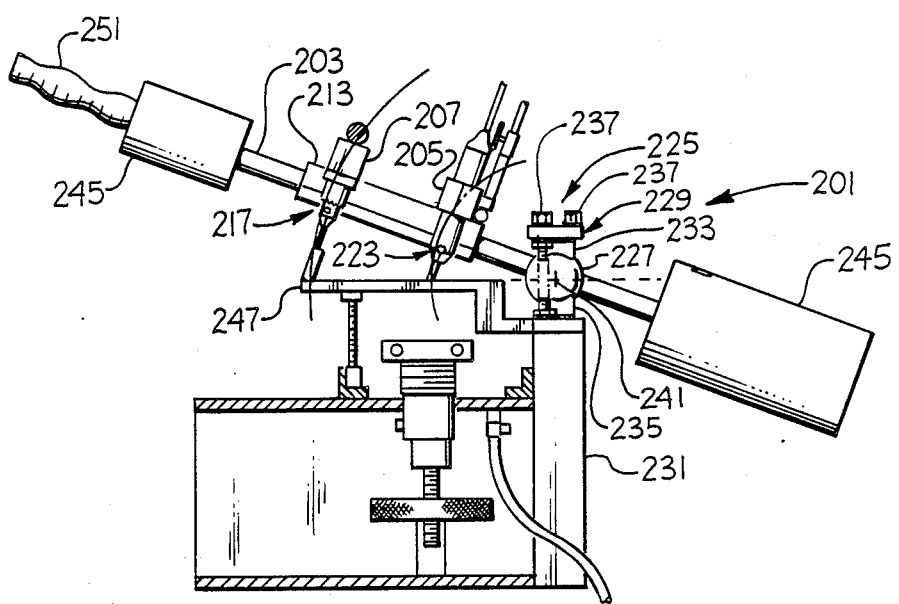
FIG. 14 is a partially cutaway side view of the device of FIG. 1.

As best seen in FIGS. 12 and 14, the support arm 203 is rotatably mounted by means of a ball and socket pivot 225. The pivot 225 is formed by a ball 227 co-axially mounted on the support rod 203 and a socket mechanism 229 secured to a stationary support 231.

The support mechanism 229 includes a top plate 233 and a bottom plate 235, each of which forms a rounded partial pocket having a radius of curvature roughly equal to that of the ball 227. The plates, 233 and 235, are secured by means of a pair of vertical bolts 237 and a connecting plate 239. By adjusting the bolts 237 upward and downward, the amount of friction between the plates 233 and 235 and the ball 227, and thus the amount of force necessary to move the support rod 203, may be varied. The pivot permits the support arm 203, and therefore, the guide arm 207 and cutting arm 205 complete freedom of movement and rotation over the model 219 and work piece 221 surfaces about a point 241 defined by the center of the ball 227.

Referring now to FIG. 13, to ensure that the bolts 237 do not limit the movement of the support rod 203 within the range of movement required to cut an exact replica of the model 219 from the work piece 221, the bolt 243 opposite the cutting mechanism 223 from the support arm 203 is positioned toward the rear of the plate 239, thereby permitting the support rod to rotate horizontally about the point 201 before the rotation is blocked by the force of the bolt 243 on the support rod 203.

Since the pivot 225 permits the entire support rod 203 to be rotated about its own axis, the mount 209 is fixed to the support rod 203, rather than being rotatable about it, as in the previous embodiment.

To dampen the vibration caused by the cutting process, without limiting the freedom of movement of the guide arm or cutting arm, the machine 201 is provided with a single dampener 244 secured to the cutting arm 205. As best seen in FIGS. 12 and 13, the dampener 244 is constructed and secured in the manner described above in connection with the pantograph machine 1 of the first embodiment.

Referring to FIG. 12, the machine 201 is also provided with a pair of counterweights 245 secured to the support rod 203 on either side of the pivot 225 to dampen vibration and to counterbalance the weight of the support rod, the guide and cutting arms, and one another.

Figure 15:
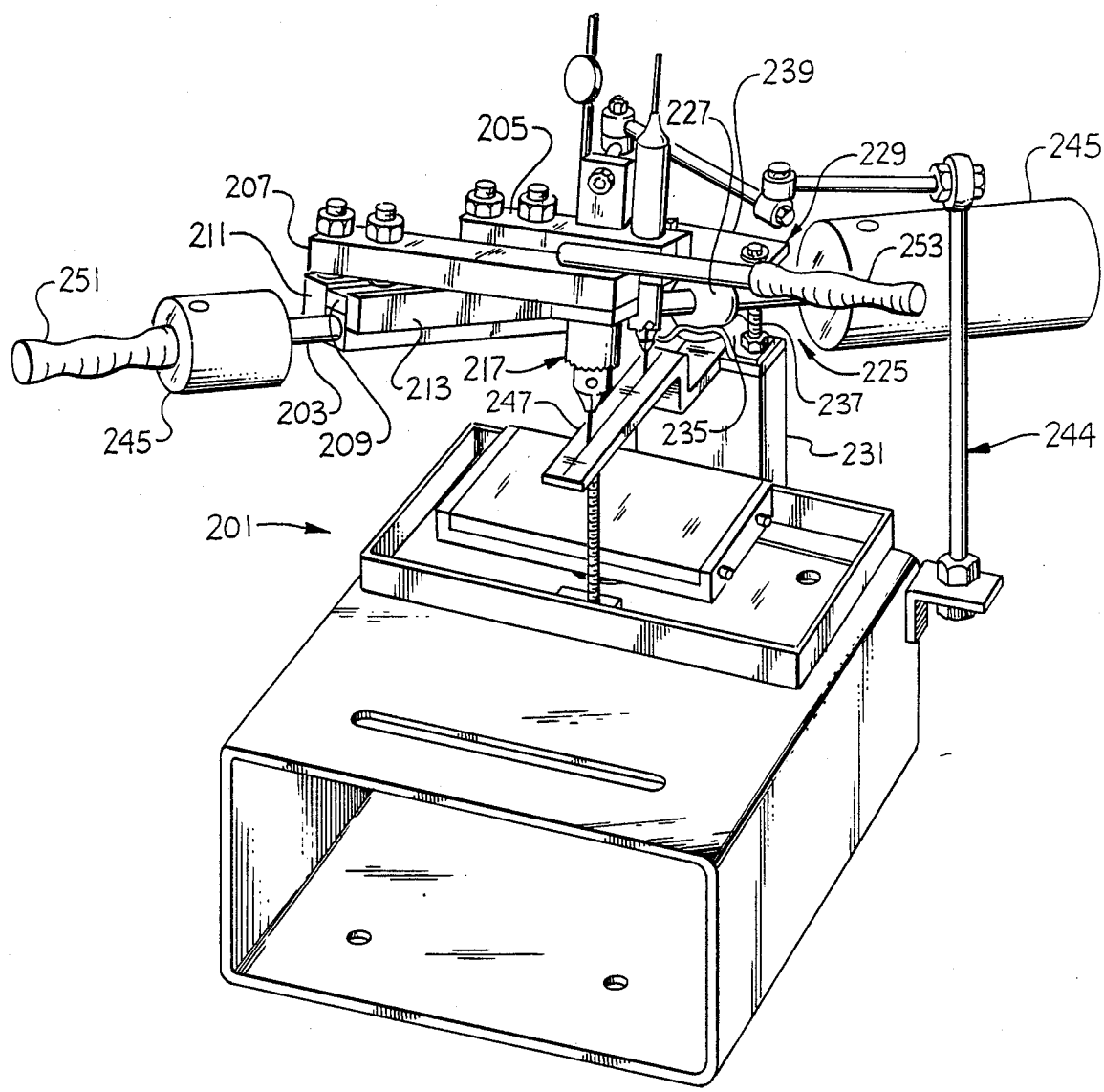
FIG. 15 is a perspective view of the device of FIG. 12.

As shown in FIGS. 14 and 15, the guide mechanism 217 and cutting mechanism 223 of the machine 203 are readily alignable by means of a platform 247 aligned with the point 241 at the center of the ball 227. Advantageously, the platform 247 is itself aligned and retained by means of inserting it into a pocket 249 formed by the lower plate 235 of the socket mechanism 229 and the stationary support 231. Thus aligned, the pantograph machine's unique design assures that the cutting mechanism 223 will perfectly mimic the proportionately greater movements of the guide mechanism 217 during the cutting process, thereby enabling a virtually exact replica of the model 219 to be cut from the workpiece 221.

As the machine is operated by means of handles extending from the ends of the support rod and the cutting arm, 251 and 253, respectively, in the same manner as the embodiment discussed above, the description of this method of operation will not be repeated here.

The present device provides a light, easily maneuverable, inexpensive means for creating reduced copies of model figures from blanks. Due to its unique configuration and its vibration absorbing features, it is able to render exceptionally accurate copies from even the hardest materials.

I claim:

1. A device for forming three-dimensional facsimiles from a blank, said device adapted to reproduce a model in a smaller or larger size, comprising:
    a rod rotatable about each of two axes;
    a guide arm rotatable about the axis of said rod and about an axis which intersects and is perpendicular to the axis of said rod, said guide arm providing means for sensing the configuration of said model;
    a cutting arm rotatable about the axis of said rod and about an axis which intersects and is perpendicular to the axis of said rod, said cutting arm providing means for removing unwanted material from said blank to form said facsimile;
    means for securing one point of said guide arm against movement in a direction parallel to the axis of said rod;
    means for securing one point of said cutting arm against movement in a direction parallel to the axis of said rod; and
    means for securing said guide arm and said cutting arm in a parallel relationship to one another, wherein said two axes intersect one another.

2. The device of claim 1, further comprising a pivot point, wherein said rod is rotatable about any axis which intersects said point and which is also contained in the vertical plane which includes said point.

3. The device of claim 2, wherein said rod is rotatable about its own axis.

4. A device for forming a three-dimensional facsimile from a blank, comprising:
    a pivot,
    a support rod secured to said pivot rotatable about each of two intersecting axes;
    a mount rotatable about the axis of said rod secured against movement along the axis of said rod;
    a guide arm secured to said mount and rotatable relative said mount about an axis which is perpendicular to and intersects the axis of said rod;
    arm secured to said mount and rotatable relative said mount about an axis which is perpendicular to and intersects the axis of said rod; and
    a brace rotatably secured to each of said arms so that the axes of rotation of said arms relative said brace, in conjunction with the axes of rotation of said arms relative said mount, form a parallelogram.

5. The device of claim 4, wherein said intersecting axes intersect at a point about which said pivot rotates.

6. The device of claim 5, wherein said rod is rotatable about any axis which intersects said point and which is also contained in the vertical which includes said point.

7. The device of claim 6, wherein said rod is rotatable about its own axis.

8. The device of claim 7, wherein said pivot is a ball and socket pivot.

9. The device of claim 5, further comprising:
    a cutting shaft secured to said cutting arm parallel to said axis of rotation of said cutting arm relative said mount and parallel to a plane including said axis of rotation of said cutting arm relative said mount and said axis of rotation of said cutting arm relative said brace., and a guide shaft secured to said guide arm parallel to said axis of rotation of said guide arm relative said mount and parallel to a plane including the axis of rotation of said guide rod relative said mount and the axis of rotation of said guide arm relative said brace.

10. The device of claim 9, wherein said intersecting axes are perpendicular to one another.

11. The device of claim 9, wherein said rod is rotatable about any axis which intersects said point and which is also contained in the vertical plane which includes said point.

12. The device of claim 9, wherein the distance between said intersection and said axis of rotation of said cutting arm relative said rod is shorter than the distance between said intersection and said axis of rotation of said guide arm relative said rod.

13. The device of claim 9, further comprising a first counterweight secured to said rod opposite said intersection from said mount.

14. The device of claim 13, further comprising a second counterweight secured to said rod opposite said mount from said first counterweight.

15. The device of claim 14, further comprising a third counterweight secured to said guide arm proximate said guide shaft.

16. The device of claim 11, further comprising a first counterweight secured to said rod opposite said intersection from said mount.

17. The device of claim 16, further comprising a second counterweight secured to said rod opposite said mount from said first counterweight.

18. The device of claim 9, including dampeners secured to said guide arm or said tool arm.

19. The device of claim 18, wherein said dampener includes a first shaft rotatable about its axis secured to a fixed support, a second shaft perpendicular to said first shaft and secured thereto, rotatable about its axis, and a link secured to said second shaft and rotatable about an axis perpendicular to the axis thereof, connected to one of the arms of said device.

20. The device of claim 19, wherein said link connected to the guide arm is generally C-shaped.

21. The device of claim 11, including dampeners secured to said guide arm or said tool arm.

22. The device of claim 21, wherein said dampener includes a first shaft rotatable about its axis secured to a fixed support, a second shaft perpendicular to said first shaft and secured thereto, rotatable about its axis, and a link secured to said second shaft and rotatable about an axis perpendicular to the axis thereof, connected to one of the arms of said device.

23. A dampener for a device for cutting three-dimensional replicas from a blank, comprising:
a first shaft rotatable about its axis secured to a fixed support;
a second shaft secured to said first shaft and rotatable about its axis; and
a substantially rigid link secured to said second shaft and rotatable about an axis perpendicular to the axis thereof, rotatably connected to one of the arms of said device.

* * * * *

UNITED STATES PATENT AND TRADEMARK OFFICE
CERTIFICATE OF CORRECTION

PATENT NO. : 4,863,318
DATED : September 5, 1989
INVENTOR(S) : Peter M. Pearl

It is certified that error appears in the above-identified patent and that said Letters Patent is hereby corrected as shown below:

Column 4, line 34, change "block 2" to --block 22--
Column 7, line 41, change "A Second Cutting Arm Referring to..." to --A Second Cutting Arm--
Column 9, line 14, change "rod ends 11" to --rod ends 111--
Column 13, line 2, change "21 is a replica" to --221 is a replica--

Column 13, line 44, change "Referring to Fig. 12 the machine 201" to --The machine 201--
Column 14, line 46, change "arm" to --a cutting arm--

Signed and Sealed this

Ninth Day of June, 1992

Attest:

DOUGLAS B. COMER

*Attesting Officer*  *Acting Commissioner of Patents and Trademarks*